United States Patent
Amadieu et al.

(10) Patent No.: US 11,461,308 B2
(45) Date of Patent: Oct. 4, 2022

(54) SYSTEM AND METHOD FOR OPTIMIZING TRANSMISSION OF REQUESTS FOR UPDATED CONTENT FROM EXTERNAL DATA SOURCES

(71) Applicant: AMADEUS S.A.S., Biot (FR)

(72) Inventors: Olivier Amadieu, Roquefort-les-Pins (FR); Fadi Akrimi, Antibes (FR); Jean-Chafic Hays, Nice (FR); Aurelie Camberbec, Valbonne (FR)

(73) Assignee: AMADEUS S.A.S., Biot (FR)

( * ) Notice: Subject to any disclaimer, the term of this patent is extended or adjusted under 35 U.S.C. 154(b) by 267 days.

(21) Appl. No.: 16/724,542

(22) Filed: Dec. 23, 2019

(65) Prior Publication Data

US 2021/0191918 A1 Jun. 24, 2021

(51) Int. Cl.
*G06F 16/00* (2019.01)
*G06F 16/23* (2019.01)
(Continued)

(52) U.S. Cl.
CPC ........ *G06F 16/2365* (2019.01); *G06F 9/3836* (2013.01); *G06F 9/4881* (2013.01); *G06F 16/235* (2019.01)

(58) Field of Classification Search
CPC .. G06Q 30/0201; G06Q 50/14; G06Q 10/025; G06Q 10/02; G06Q 30/0233; G06Q 30/0255; G06Q 20/4014; G06Q 30/0222; G06Q 30/0226; G06Q 30/0244; G06Q 30/0283; G06Q 30/0601; G06Q 30/0635;
(Continued)

(56) References Cited

U.S. PATENT DOCUMENTS

2001/0054020 A1* 12/2001 Barth ...................... G06F 16/00
705/37
2001/0056362 A1* 12/2001 Hanagan ............... G06F 16/289
705/40

(Continued)

OTHER PUBLICATIONS

Degenaro, Louis et al. "A middleware system which intelligently caches query results." in IFIP/ACM International Conference on Distributed Systems Platforms and Open Distributed Processing, pp. 24-44. Springer, Berlin, Heidelberg, 2000.

(Continued)

*Primary Examiner* — Shyue Jiunn Hwa
(74) *Attorney, Agent, or Firm* — Perry + Currier (57) ABSTRACT

A method of optimizing transmission of requests for updated content from external data sources includes: storing a data object containing initial content received from at least one of the external data sources and associated with an expiry time; storing a set of optimization parameters; obtaining an instruction to request updated content corresponding to the data object; in response to obtaining the instruction, determining, based on the optimization parameters and the expiry time, whether to request updated content from the external data sources; when the determination is affirmative, transmitting at least one update request to at least one of the external data sources based on the initial content and the optimization parameters; and in response to transmitting the at least one update request, receiving and storing respective sets of updated content from the external data sources.

19 Claims, 7 Drawing Sheets

(51) Int. Cl.
*G06F 9/38* (2018.01)
*G06F 9/48* (2006.01)

(58) Field of Classification Search
CPC ............... G06Q 30/0641; G06Q 50/26; G06Q 30/0619; G06F 16/9024; G06F 16/2455; G06F 16/248; G06F 17/16; G06F 12/0891; G06F 16/235; G06F 16/2365; G06F 16/24539; G06F 16/24568; G06F 16/24573; G06F 16/285; G06F 16/29; G06F 40/143; G06F 40/295; G06F 40/30; G06F 9/3836; G06F 9/4881; H04L 63/0428; H04L 67/568; G06N 20/00
See application file for complete search history.

(56) References Cited

U.S. PATENT DOCUMENTS

| | | | |
|---|---|---|---|
| 2008/0235292 A1 | 9/2008 | Janin et al. | |
| 2011/0179280 A1* | 7/2011 | Imrey | G06F 8/71 707/755 |
| 2017/0046732 A1* | 2/2017 | Elmachtoub | G06Q 30/0256 |

OTHER PUBLICATIONS

Bouzeghoub, Mokrane. "A framework for analysis of data freshness." in Proceedings of the 2004 international workshop on Information quality in information systems, pp. 59-67. ACM, 2004.

* cited by examiner

SYSTEM AND METHOD FOR OPTIMIZING TRANSMISSION OF REQUESTS FOR UPDATED CONTENT FROM EXTERNAL DATA SOURCES

FIELD

The specification relates generally to computing systems, and specifically to a system and method for optimizing transmission of requests for updated content from external data sources.

BACKGROUND

Some computing systems generate data for provision to client subsystems according to complex and highly variable mechanisms. Examples are systems that generate data representing items such as travel products and services, each of which may have numerous attributes that can be selected dynamically at the time of generation according to a wide variety of conditions. Attributes of the above data, such as price and seat availability for a flight, may vary over relatively short periods of time (e.g. one day).

Due to the variability of the above-mentioned data over time, operators of the client subsystems may initiate additional exploratory requests in an effort to determine whether items with more desirable attributes (e.g. lower prices) have become available since the initial request. However, due to the computationally intensive nature of generating such data, repeated requests may impose undue burden on networking and processing resources.

SUMMARY

An aspect of the specification provides a method of optimizing transmission of requests for updated content from external data sources, comprising: storing, at an intermediation server, a data object containing initial content received from at least one of the external data sources and associated with an expiry time; storing, at the intermediation server, a set of optimization parameters; obtaining an instruction at the intermediation server to request updated content corresponding to the data object; in response to obtaining the instruction, determining, based on the optimization parameters and the expiry time, whether to request updated content from the external data sources; when the determination is affirmative, transmitting at least one update request to at least one of the external data sources based on the initial content and the optimization parameters; and in response to transmitting the at least one update request, receiving and storing respective sets of updated content from the external data sources.

Another aspect of the specification provides an intermediation server; comprising: a memory storing (i) a data object containing initial content received from at least one of the external data sources and associated with an expiry time, and (ii) a set of optimization parameters; a communications interface; and a processor connected with the communications interface and the memory, the processor configured to: obtain an instruction at the intermediation server to request updated content corresponding to the data object; in response to obtaining the instruction, determine, based on the optimization parameters and the expiry time, whether to request updated content from the external data sources; when the determination is affirmative, transmit at least one update request to at least one of the external data sources based on the initial content and the optimization parameters; and in response to transmitting the at least one update request, receive and store respective sets of updated content from the external data sources.

A further aspect of the specification provides a non-transitory computer-readable medium storing computer-readable instructions executable by a processor of an intermediation server to: store (i) a data object containing initial content received from at least one of the external data sources and associated with an expiry time, and (ii) a set of optimization parameters; obtain an instruction at the intermediation server to request updated content corresponding to the data object; in response to obtaining the instruction, determine, based on the optimization parameters and the expiry time, whether to request updated content from the external data sources; when the determination is affirmative; transmit at least one update request to at least one of the external data sources based on the initial content and the optimization parameters; and in response to transmitting the at least one update request, receive and store respective sets of updated content from the external data sources.

BRIEF DESCRIPTIONS OF THE DRAWINGS

Embodiments are described with reference to the following figures, in which.

DETAILED DESCRIPTION

Figure 1:
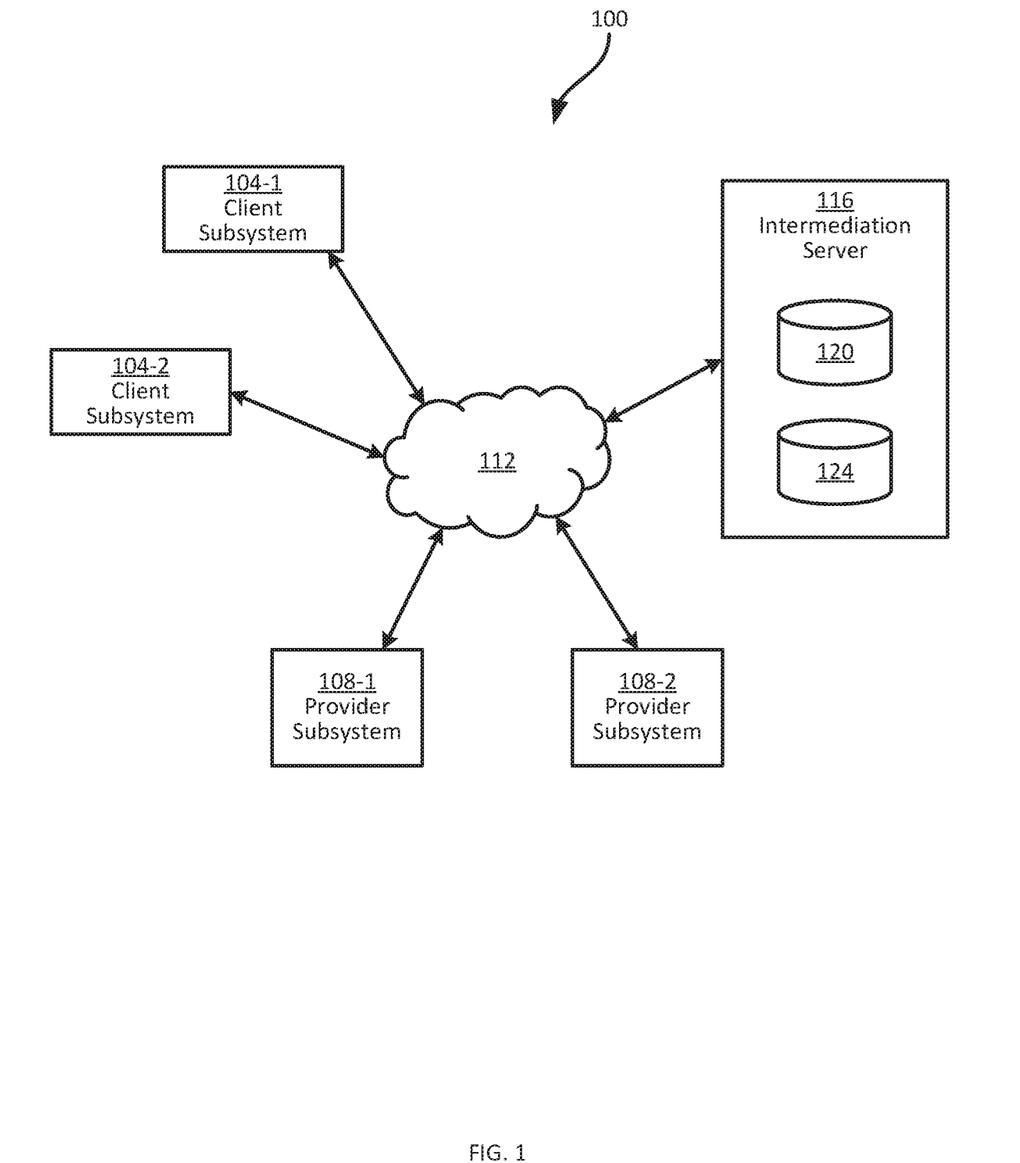
FIG. 1 is a diagram illustrating a system for optimizing transmission of requests for updated content from external data sources.

FIG. 1 illustrates a system 100 for optimizing the transmission of requests for updated content from external data sources. Within the system 100, various computing subsystems interact to generate and process data relating to any of a wide variety of activities. In the examples discussed below, the subsystems of the system 100 interact to generate and process data relating to the delivery of items to customers. The items, in the examples, below, are travel-related products and services, such as flight tickets, hotel reservations, vehicle rental reservations, and the like.

A wide variety of other activities can be enabled by the exchange of data between the subsystems shown in FIG. 1, and the specific nature of the data processed within the system 100 is not particularly limited. More generally, the generation of data processed in the system 100 imposes non-trivial computational load on the component(s) that generate the data. The data is not merely retrieved from repositories for transmission in response to requests, but is instead dynamically generated in response to each request from a variety of input data, generation rules, and the like. Further, the volume of requests and associated data in the system 100 can be significant (e.g. on the order of millions of requests per day). As will be seen below, at least some components of the system 100 are configured to optimize the transmission of requests for data to reduce the above-mentioned demands on the system 100 under certain conditions.

In the illustrated example, the system 100 includes at least one client subsystem 104, of which two examples 104-1 and 104-2 are shown in FIG. 1 (referred to collectively as the client subsystems 104 and generically as a client subsystem 104). Each client subsystem 104 is operated by a client entity that may also be referred to as a seller. The seller can be, for example, a travel agency. The client subsystems 104 generate requests, e.g. on behalf of customers, for travel items. The requests specify various attributes of the travel items, such as origin and destination locations, times and dates of travel, and the like. Responses to requests from the client subsystems 104 are generated by, or on behalf of, entities that provide the items, referred to herein as providers. Therefore, in the present example the providers are entities such as airlines, hotel operators or the like that deliver the items to the customer, or to other such entities for eventual delivery to the customer, following purchase of the items (such purchase being effected, for example, via a client subsystem 104). Providers may also be referred to interchangeably as suppliers, reflecting the fact that in some instances an item such as a flight may be booked through a first airline (e.g. the supplier) and operated by another airline (e.g. the provider).

Each provider entity operates a provider subsystem 108 (which may also be referred to as a supplier subsystem), of which two example provider subsystems 108-1 and 108-2 are shown in FIG. 1. Each of the client subsystems 104 and the provider subsystems 108 are implemented as at least one computing device with input and output assemblies and communications devices for exchanging data via a network 112. The network 112 can include any suitable combination of local-area and wide-area networks, including the Internet. Although two client subsystems 104 and two provider subsystems 108 are shown in FIG. 1, the system 100 can include a greater or smaller number of client subsystems 104 and provider subsystems 108 in other examples.

The generation of responses to requests from the client subsystems 104 can take various forms. In the illustrated example, the provider subsystems 108 are assumed to generate responses to such requests locally, although as will be seen below, the requests are not transmitted directly from the client subsystems 104 to the provider subsystems 108. In any event, in the illustrated example, each provider subsystem 108 includes an offer generation module (e.g. computer readable instructions and corresponding execution hardware, along with various stored data for use in generating responses) that enables the provider subsystems 108 to generate response data based on the attributes specified in the request originated by a client subsystem 104. The response data may also be referred to as "offer data", and defines one or more items that match or partially match the requested attributes.

As will be apparent to those skilled in the art, in the context of travel items, various distribution channels may be employed by the provider subsystems 108 and other components of the system 100 to process requests and generate data. A distribution channel encompasses a set of entities within the system 100, as well as message syntax, message sequencing and the like. In the examples discussed herein, the provider subsystems 108 implement the New Distribution Capability (NDC) distribution channel. The NDC standard defines an eXtensible Markup Language (XML) based data format, as well as message syntax, API calls and the like, for messages exchanged between client subsystems 104 and provider subsystems 108. Requests for content conveyed to the provider subsystems 108 can therefore include AirShopping messages, OfferPrice messages and the like, according to the NDC standard. Various other message types will also occur to those skilled in the art, further examples of which will also be mentioned below.

Data generated within the system 100, such as data representing travel items generated by the provider subsystems 108, is also referred to herein as content. The generation of content is not only computationally complex, but can also be highly variable according to a wide variety of conditions. For example, a request defining specific flight parameters (e.g. a non-stop flight from Barcelona to Montreal on February 16) may return content defining a flight with a first price. The same request made the following day may return content defining a flight with a second price that is different from the first price. The distinct prices may even correspond to the same flight, operated by the same airline. Other item attributes defined in content generated by the provider subsystems 108 can be subject to similar variations, such as ancillary services included with a flight and the like.

Variations in content such as those mentioned above may be partially or entirely opaque to an operator of a client subsystem 104. In addition, a given set of content, defining one or more items that may be purchased by or on behalf of a customer, may include a validity time. The content mentioned above defines an offer, which can be booked by or on behalf of a customer (thereby leading to generation of an order). The validity time is set by the provider subsystem 108, and indicates a period of time (beginning from the generation of the content) for which the offer is valid. For example, a provider subsystem 108 may transmit content for delivery to a client subsystem 104 defining the above-mentioned flight from Barcelona to Montreal, along with a validity time indicating that the offer is valid for three days. If the client subsystem 104 attempts to book (i.e. convert to an order) the offer four days later, the request may be denied and the client subsystem 104 may be required to obtain new offers.

When an offer is booked, securing the relevant item on behalf of a customer, the relevant provider subsystem 108 may also provide the client subsystem 104 that initiated the booking with an expiry time. The expiry time indicates a time period in which a condition must be satisfied for the booking to remain active. The condition can be, for example, the provision of payment for the corresponding item(s) to the provider subsystem 108. That is, in some implementations an offer can be booked without immediate payment being made. For example, a client subsystem 104 can book an offer, securing the relevant item on behalf of a customer, but may be permitted 24 hours to provide payment. The 24-hour period is the expiry time, and if payment is not provided within the expiry time, the booking is revoked. In other examples, rather than the booking being revoked after the expiry time, the price of the item may be subject to change.

The opacity of variations in content, as well as the availability of the above-mentioned expiry time, may lead the control of client subsystems 104 (e.g. by operators thereof) to request updated content from at least some of the provider subsystems 108. When requested, the updated content can be evaluated to determine whether it is more desirable than the currently booked content (i.e. "better" than the currently booked order). The mechanisms employed to perform such an evaluation are beyond the scope of this discussion. Examples of content that is more desirable than initial (booked) content can include content defining the same item at a lower price, including additional (or more relevant to the customer) ancillary services, and the like.

When the updated content is evaluated as being more desirable, the initial content may be replaced with the updated content. Various mechanisms may be employed for such replacement, depending in part on the provider subsystem(s) 108 from which the initial content and the updated content originated.

As will now be apparent to those skilled in the art, requests for updated content generated by client subsystems 104 following bookings can lead to significant additional computational load on components of the system 100 such as the provider subsystems 108, as well as increased traffic in the network 112. The system 100 is therefore also configured to optimize the generation and transmission of such requests for updated content. The optimization enabled by the system 100 can enable client subsystems 104 to continue determining whether better offers are available than an initial order, while mitigating the impact of such determinations on computational resources within the system 100.

To that end, the system 100 includes an intermediation server 116 (also referred to herein simply as the server 116) connected with the network 112. Requests generated by the client subsystems 104 are transmitted via the network 112 to the intermediation server 116. The intermediation server 116 receives requests from the client subsystems 104, and passes such requests to the provider subsystems 108. The intermediation server 116 also receives responses from the provider subsystems 108, for return to the client subsystems 104. The server 116 can also relay messages between the client subsystems 104 and the provider subsystems 108 to book offers (i.e. to generate orders), and to modify such orders.

The server 116 also obtains instructions, e.g. directly from the client subsystems 104 or based on stored configuration settings, to check for updated content corresponding to previously booked content. Responsive to such instructions, the server 116 performs various actions to determine whether to check for updated content, and selects a mechanism for performing such a check when the determination is affirmative. The above-mentioned configuration settings, as well as other configuration data to be discussed below in greater detail, are stored at the server 116 in a configuration repository 120. The server 116 can also store the content itself (e.g. any booked orders) in a content repository 124.

Before further discussion of the functionality of the various components of the system 100, certain internal components of the intermediation server 116 will be described in connection with FIG. 2.

Figure 2:
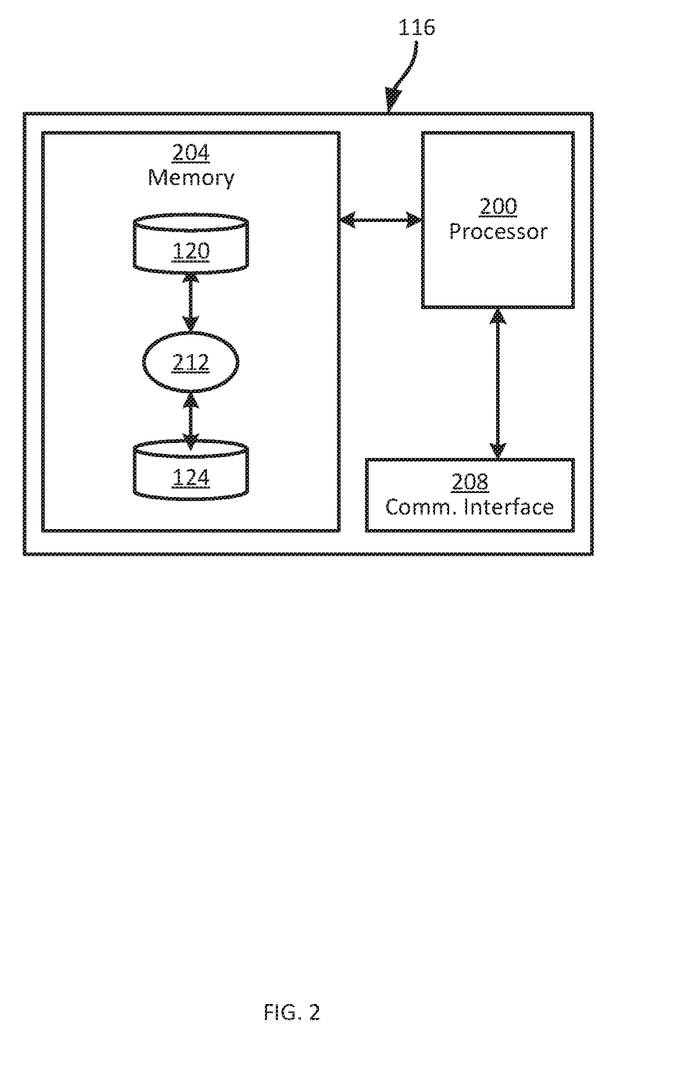
FIG. 2 is a diagram illustrating certain internal components of the intermediation server of FIG. 1.

Turning to FIG. 2, the intermediation server 116 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communication interface 208, which enables the server 116 to communicate with the other computing devices of the system 100 via the network 112. The communication interface 208 therefore includes any necessary components (e.g. network interface controllers (NICs), radio units, and the like) to communicate via the network 112. The specific components of the communication interface 208 are selected based on the nature of the network 112. The server 116 can also include input and output devices connected to the processor 200, such as keyboards, mice, displays, and the like (not shown).

The components of the server 116 mentioned above can be deployed in a single enclosure, or in a distributed format. In some examples, therefore, the server 116 includes a plurality of processors, either sharing the memory 204 and communication interface 208, or each having distinct associated memories and communication interfaces.

The memory 204 stores the repositories 120 and 124, as well as computer-readable instructions executable by the processor 200 to implement various functionality. The computer-readable instructions may also be referred to as applications, and in the illustrated example the memory 204 stores a content handling application 212 (also referred to herein simply as the application 212). In the description below, the processor 200, and more generally the server 116, are said to perform, or to be configured to perform, those actions. It will be understood that they are so configured via the execution (by the processor 200) of the instructions of the applications stored in memory 204, including the application 212.

Execution of the application 212 by the processor 200 configures the server 116 to obtain instructions to request updated content corresponding to content stored in the repository 124, and to process such requests as described in detail below.

Figure 3:
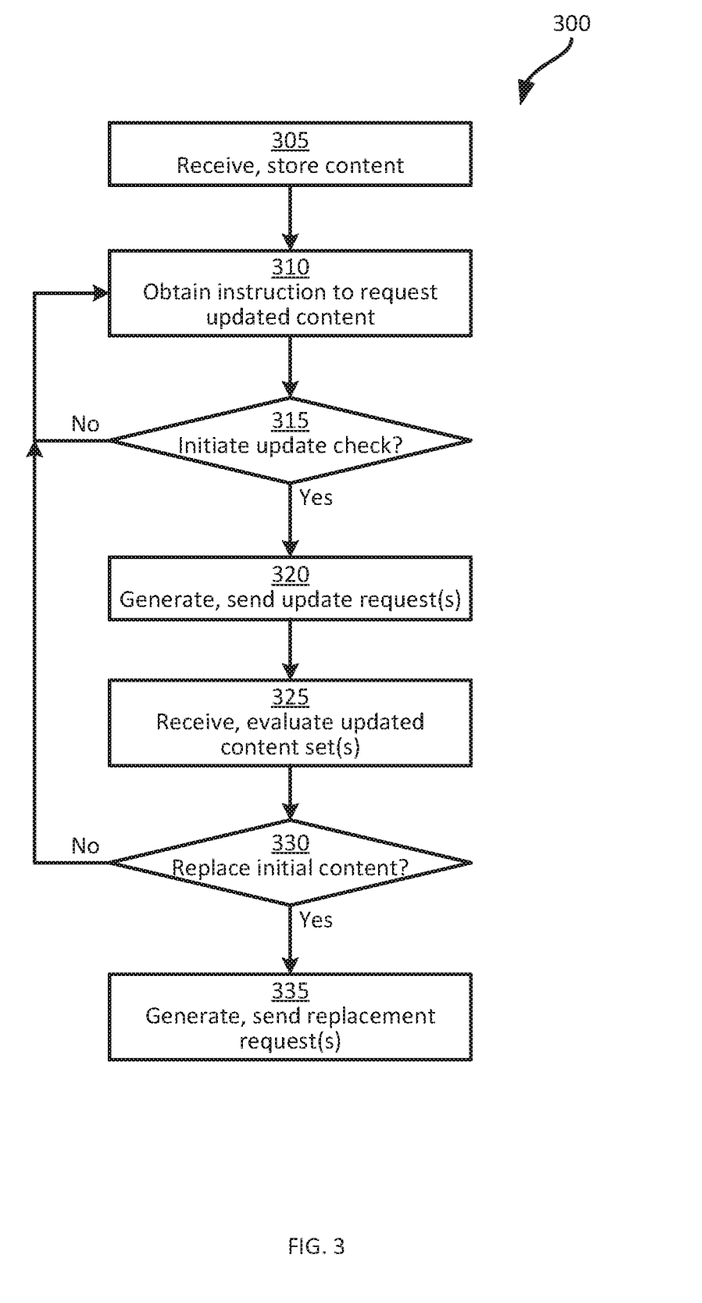
FIG. 3 is a flowchart of a method for optimizing transmission of requests for updated content from external data sources.

Turning now to FIG. 3, certain aspects of the operation of the system 100 will be described in greater detail. Specifically, FIG. 3 illustrates a method 300 of optimizing transmission of requests for updated content from external data sources. The performance of the method 300 will be discussed in conjunction with its performance within the system 100, and specifically by the intermediation server 116 via execution of the integration application 212.

At block 305, the server 116 receives content for storage in the repository 124. The receipt of content can be preceded by a variety of other actions that are outside the scope of the present discussion. In brief, those actions include receiving a request for offers at the server 116 from a client subsystem 104 (e.g. the client subsystem 104-1), and the transmission of requests to at least one of the provider subsystems 108 based on the request for offers. The actions further include receiving offers from the provider subsystems 108, the transmission of the offers to the client subsystem 104-1, and the receipt of a selection of a subset of the offers for booking from the client subsystem 104-1. In other words, the content received at block 305 corresponds to a booked offer, also referred to as an order.

Figure 4:
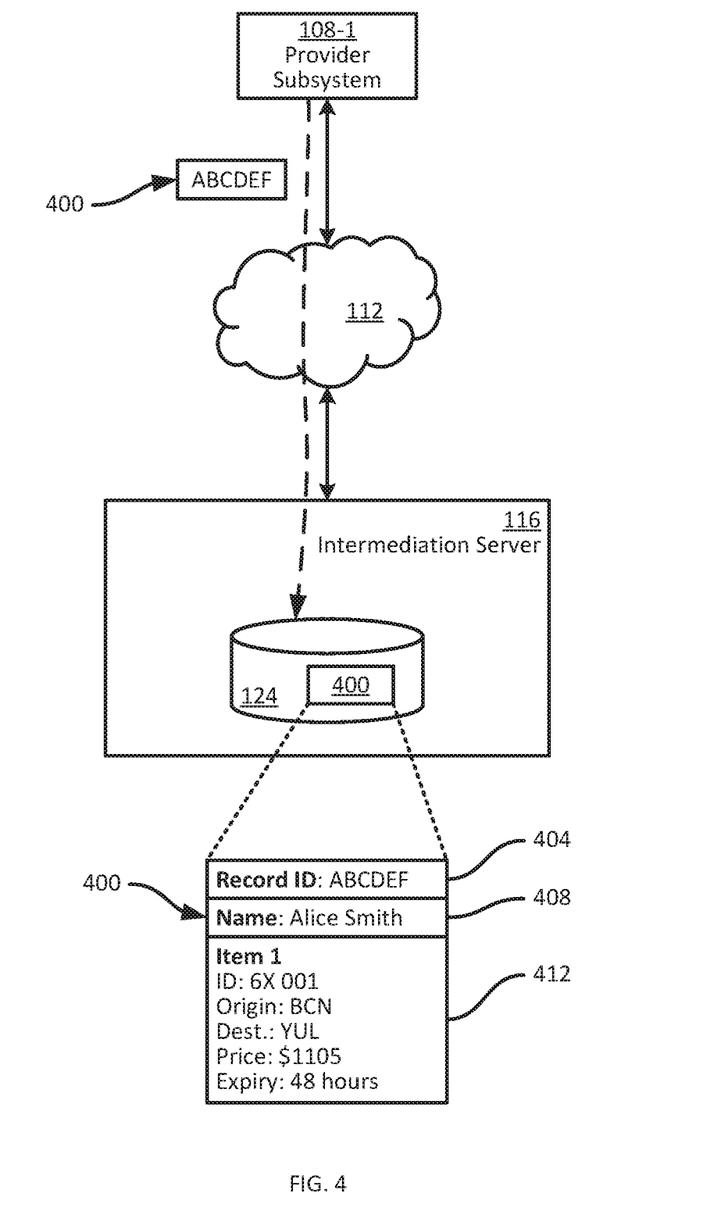
FIG. 4 is a diagram illustrating an example performance of block 305 of the method of FIG. 3.

Turning to FIG. 4, an example performance of block 305 is shown. In particular, the provider subsystem 108-1 is shown transmitting content in the form of a data object 400 to the server 116 via the network 112. The legacy data object 400 can be, for example, an Order record resulting from an earlier request by the client subsystem 104-1 to book an offer.

The data object 400 is stored in the repository 124. The contents of the data object 400 are also shown in FIG. 4. In the illustrated example, the data object 400 includes a record identifier field 404 (e.g. a booking reference), a name field 408, and an item definition field 412. The item definition field 412 includes various attributes of the item defined by the data object 400, such as a flight identifier ("6X 001"), an origin identifier (corresponding to Barcelona in this example), a destination identifier (corresponding to Montreal in this example), and a price. The data object 400 also defines an expiry time of 48 hours from generation of the order (which may also be indicated in the data object 400). The expiry time can be defined in other ways as well; for example, the expiry may be defined as a time and date rather than a duration. A wide variety of additional attributes can be included in the field 412, and various other fields can also be included in the data object 400.

Returning to FIG. 3, at block 310 the server 116 obtains an instruction to request updated content. In particular, the instruction is to request updated content corresponding to the data object 400 shown in FIG. 4. The server 116 can perform multiple instances of the method 300 in parallel, each corresponding to a different data object.

Various origins are contemplated for the instruction obtained at block 310. In some examples, the server 116 obtains such an instruction by receiving the instruction from the client subsystem 104 associated with the relevant data object. Thus, in the example of FIG. 4, the client subsystem 104-1 with which the data object 400 is stored can transmit an instruction to check for updated content to the server 116 via the network 112. In other examples, the server 116 automatically generates the request internally, for example at a configurable frequency.

The mechanism by which the server 116 obtains the instruction at block 310 can be defined in update scheduling configuration data stored in the repository 120. Example update scheduling configuration data is shown below in Table 1.

TABLE 1

Update Scheduling Configuration

| Client Subsystem | Automatic Requests | Frequency |
|---|---|---|
| 104-1 | Enabled | 12 pm daily |
| 104-2 | Disabled | N/A |

As seen above, different modes of obtaining the above instruction at the server 116 can be specified for each client subsystem 104. For example, Table 1 indicates that automatic generation of instructions to request updated content is enabled for the client subsystem 104-1, but disabled for the client subsystem 104-2. Therefore, the performance of block 310 for data objects associated with the client subsystem 104-2 involves receiving an explicit instruction from the client subsystem 104-2.

The performance of block 310 for data objects associated with the client subsystem 104-1, however, includes automatic generation, by the server 116 itself, of such requests according to the settings shown in Table 1. Thus, in the illustrated example, the server 116 is configured to generate an instruction at block 310 corresponding to the data object 400 once per day at 12 pm. The enabling of automatic request generation can disable the receipt of explicit instructions. In other examples, however, enabling automatic request generation still permits the receipt of explicit instructions to request updated content. Other mechanisms can be employed for automatically generated requests than the scheduled implementation shown in Table 1. For example, the server 116 can be configured to automatically generate an instruction at block 310 within a predetermined time period of the expiry time specific to the relevant data object. That is, the "frequency" setting above can specify "1 hour before expiry", for example.

As will now be apparent, the update scheduling configuration data enables the server 116 to operate in either of a passive mode and an active mode. In the passive mode, a client subsystem 104 need not explicitly send an instruction to the server 116 via the network 112 (thus causing additional network load). In the active mode, in contrast, the client subsystem 104 actively requests update checks. A wide variety of other settings can also be stored in Table 1. For example, configurations can be specific not only to a client subsystem 104, but to a pairing of client subsystem 104 and customer, a pairing of client subsystem 104 and provider subsystem 108, and the like.

Following generation or receipt of an instruction to request updated content, at block 315 the server 116 determines whether to initiate a check for updated content related to the data object 400. For example, any instruction obtained at block 310 can be placed in an instruction queue in the memory 204, and at block 315 the server 116 determines whether to retrieve an instruction from the queue and generate update request(s) according to the instruction. The determination at block 315 is based on any of a variety of optimization parameters. The optimization parameters, examples of which will be discussed below, can include update request frequency thresholds, time thresholds, and historical trend data corresponding to the data object 400.

The determination at block 315 can be based on various factors. In some examples, turning to FIG. 5, the determination at block 315 can be performed according to a method 500, in which at least one threshold is evaluated at the server 116. In particular, at block 505 the server 116 is configured to determine a remaining time between the current time and the expiry time defined in the data object 400. The server 116 is further configured to determine whether the remaining time is below a time threshold. The repository 120 can store time thresholds for each provider subsystem 108, for each pairing of provider subsystem 108 and client subsystem 104, a single system-wide threshold, or the like.

Figure 5:
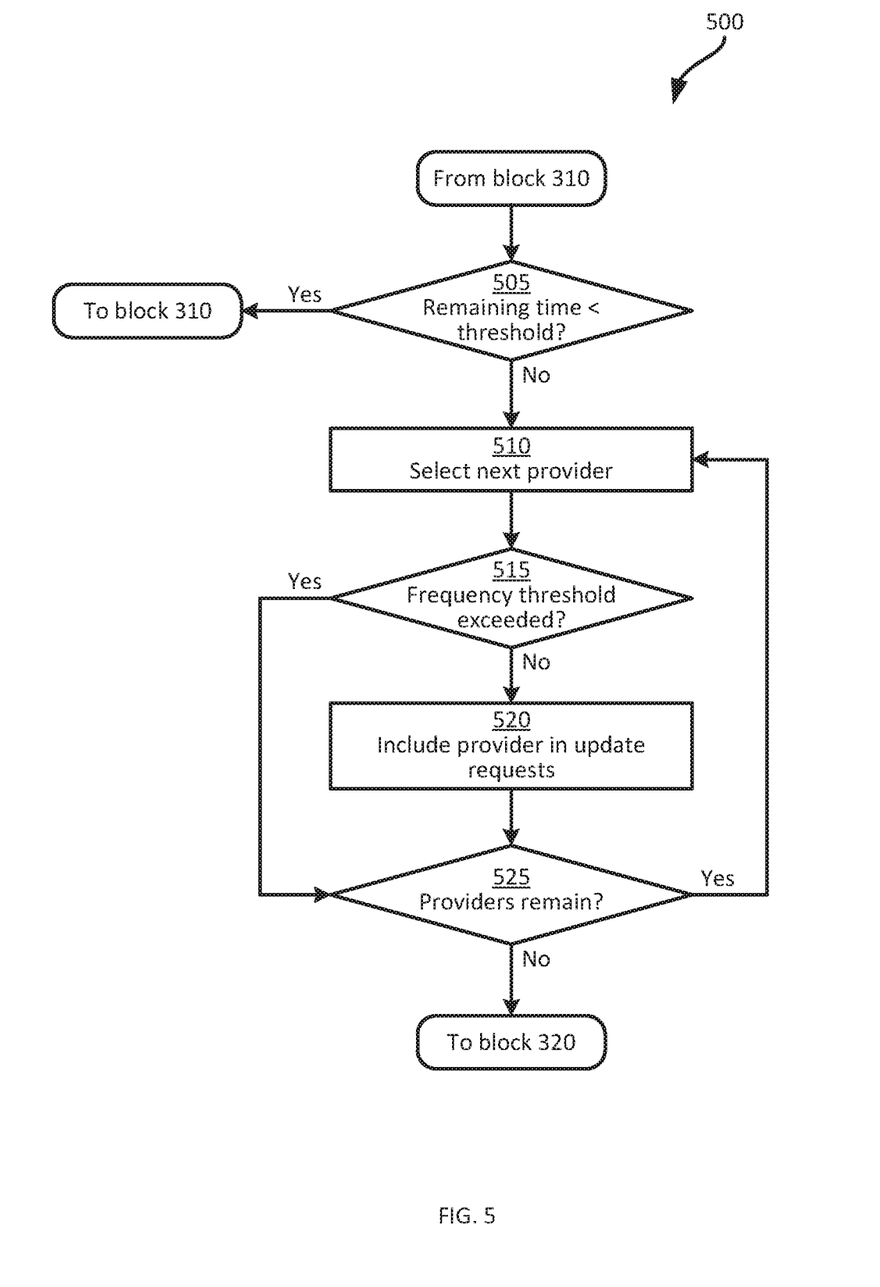
FIG. 5 is a flowchart of a method for performing block 315 of the method of FIG. 3.

When the remaining time before expiry is below the above-mentioned threshold, the server 116 returns to block 310. In returning to block 310, the server 116 can simply discard the instruction generated at the previous performance of block 310, or can retain the instruction in the above-mentioned queue for re-evaluation at a subsequent performance of block 315. In other words, when the remaining time is sufficiently low, further update requests may be suppressed by the server 116.

When the determination at block 505 is negative, indicating that the remaining time before expiry is not below the threshold, the server 116 proceeds to block 510. At block 510, the server 116 is configured to select one of a set of provider subsystems 108 to which update requests may be sent. That is, the actions performed in the remainder of the method 500 are not necessarily restricted to the provider subsystem 108 that originated the data object 400, but can be repeated for other provider subsystems 108. Which provider subsystems 108 are selected amongst in a given performance of the method 500 can be determined according to configuration parameters in the repository 120. For example, such parameters can specify which provider subsystems 108 to select from at block 510 for each client subsystem 104.

In the present example, at block 510 the provider subsystem 108-1 is selected. At block 515, the server 116 determines, for the selected provider subsystem 108, whether an update request frequency threshold has been exceeded. Various forms of update request frequency thresholds are contemplated. Examples of such thresholds, which can be stored in the repository 120, are shown below in Table 2.

TABLE 2

Frequency Thresholds

| Provider Subsystem | OrderReshop Threshold | AirShopping Threshold |
|---|---|---|
| 108-1 | 3 per order | N/A |
| 108-2 | N/A | 10000 per day |

As seen in Table 2, the repository 120 can contain separate request frequency thresholds for different types of requests. For example, the above example specifies different thresholds for "OrderReshop" requests, which are NDC-based requests specifically for updating existing bookings, and for AirShopping requests, which include a variety of NDC-based requests for obtaining new offers (i.e. not connected with an existing booking/order). Other types of update requests are also contemplated in the context of NDC-based systems, including OfferPrice requests, SeatAvailability requests, and ServiceList requests.

The thresholds specified in Table 2 may be populated at deployment of the system 100, for example according to business or technical requirements communicated to the server 116 by the provider subsystems 108. In other examples, the thresholds may be determined by the server 116 dynamically. Specifically, exceeding the above thresholds for a given provider subsystem 108 may result in subsequent update requests being rejected by the provider subsystem 108. The server 116 can determine a threshold based on how many requests of a given type were sent to that provider subsystem 108 over a time period (e.g. one day).

At block 515, therefore, the server 116 determines whether any of the above thresholds have been exceeded for the selected provider subsystem 108. When the determination at block 515 is negative, the server 116 includes the selected provider subsystem 108 in the update request generation process to be discussed below. The server 116 then determines whether any provider subsystems 108 remain to be processed at block 525.

When the determination at block 515 is affirmative, the server 116 proceeds directly to block 525. In other words, block 520 is bypassed, and no update requests will be transmitted to the selected provider subsystem 108. In some examples, some request type thresholds may have been exceeded for a given provider subsystem 108, while other thresholds may not have been exceeded. In such examples, the determination at block 515 can be negative, and at block 520 the server 116 marks the relevant provider subsystem 108 as a candidate for an update request, and also stores the type(s) of request for which thresholds have not been exceeded, for later use.

When provider subsystems 108 remain to be processed, the server 116 proceeds from block 525 to block 510 to select the next provider subsystem 108. When all provider subsystems 108 have been processed via blocks 510-520, the determination at block 525 is negative, and the server 116 proceeds to block 320 for generation of update requests.

Figure 6:
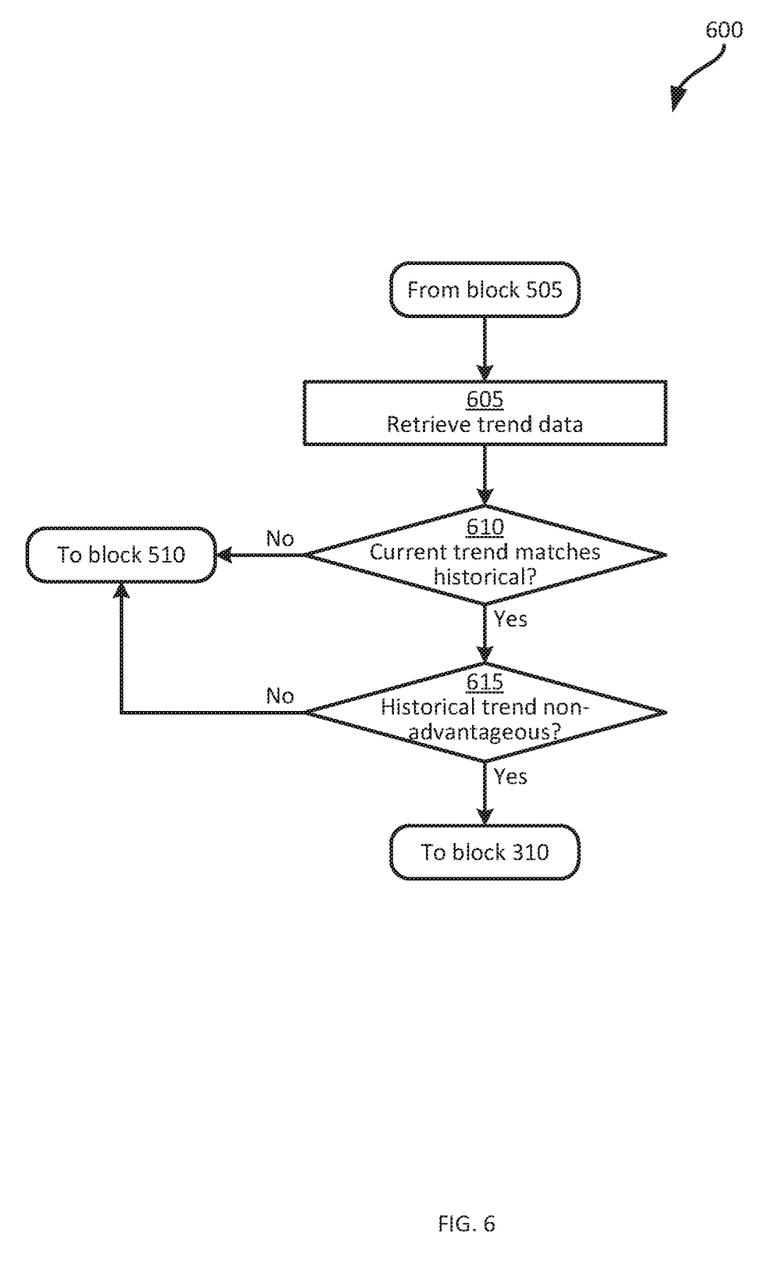
FIG. 6 is a flowchart of another method for performing block 315 of the method of FIG. 3.

Before discussing the remainder of the method 300, FIG. 6 illustrates further functionality according to which the server 116 can perform the determination at block 315. FIG. 6 illustrates a method 600 according to which the server 116 can determine whether to proceed with at least one update request at block 315. In the present example, the method 600 is illustrated as having been integrated with the functionality of the method 500 discussed above. In other examples, however, the method 600 can be performed independently of the method 500 to implement block 315.

At block 605, in the present example it is assumed that the determination at block 505 was negative, indicating that sufficient time remains before expiry of the data object 400 to perform an update request. At block 605 the server 116 is configured to retrieve trend data for a given attribute specified in the data object 400. For example, at block 605 the server 116 can retrieve the trend data for the price of flights between Barcelona and Montreal. The trend data can be retrieved from another repository at the server 116, or by requesting the data from another component (not shown) of the system 100.

The trend data retrieved at block 605 includes current trend data, defining variations in the relevant attribute (e.g. price) extending from the current time and date back in time by a configurable interval. The trend data retrieved at block 605 also includes historical trend data, defining variations in the same attribute over a corresponding period beginning earlier in time. For example, if the current trend data indicates price variations from three months ago to the current time, the historical trend data may indicate price variations from one year and three months ago to nine months ago. That is, the current trend data represents a period of three months, and the historical trend data represents the same three-month period from one year earlier, as well as the next three months of the previous year.

Figure 7:
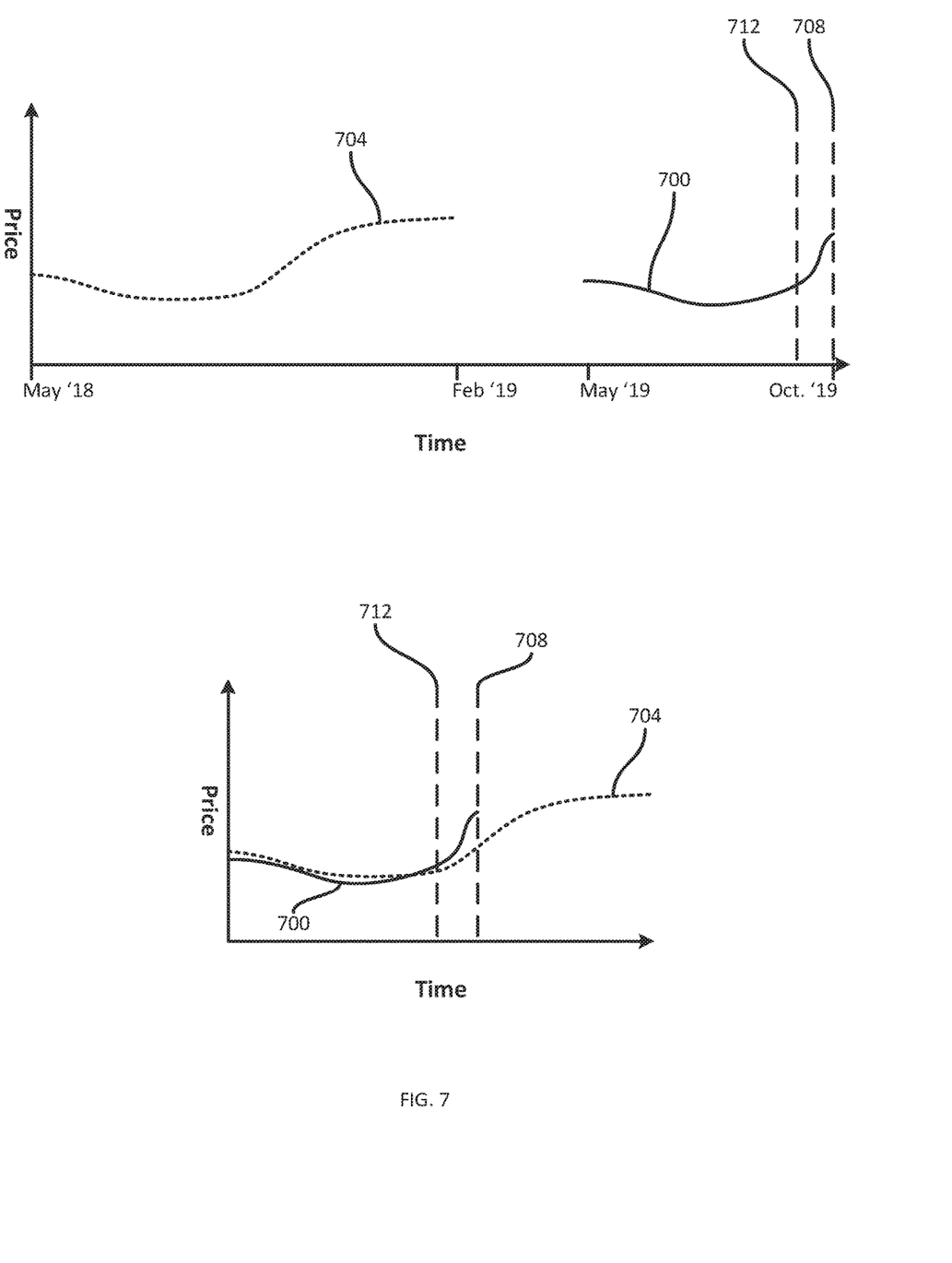
FIG. 7 is a diagram illustrating trend data employed in the performance of the method of FIG. 6.

Turning to FIG. 7, example trend data is shown, including current trend data 700 and historical trend data 704. The current trend data may extend from a current time 708 back by a predefined period of time, e.g. 5 months. The historical trend data 704 extends from one year and 5 months in the past (i.e. one year before the beginning of the current trend data) to three months before the beginning of the current trend data 700. A wide variety of other time periods may also be employed. A current time 708 is also shown, as is a time 712 at which the data object 400 was generated (i.e. a booking time). In the lower portion of FIG. 7, the trend data 700 and 704 are overlaid, ignoring the year and aligning the trends by month and day.

Returning to FIG. 6, at block 610, the server 116 is configured to determine whether the current trend data matches the historical trend data. That is, the server 116 is configured to determine, in the present example, whether recent variations in pricing for flights from Barcelona to Montreal are similar to variations in pricing for the same flights over the same period of the previous year. Various techniques can be applied by the server 116 to make the determination at block 610, and the match need not be exact.

As seen from the overlay in FIG. 7, the current trend data 700 follows a similar path as the historical trend data 704. The determination at block 610 is therefore affirmative. The server 116 therefore proceeds to block 615. When the determination at block 610 is negative, indicating that the historical trend data holds little predictive power for current variations in pricing, the server 116 instead proceeds to block 510 and the trend data is not used in making the determination at block 315.

At block 615, the server 116 determines whether the historical trend data indicates a non-advantageous trend. In the present example, the server 116 can determine whether the historical trend data 704 indicates that the price is likely to increase in the near future (e.g. before the expiry of the data object 400). In other words, when the historical trend data 704 and the current trend data 700 match, the server 116 is configured to predict future changes in the relevant attribute using the historical trend data. When the determination at block 615 is negative, further evaluation of thresholds can continue at block 510.

As seen in FIG. 7, the historical trend data 704 indicates a continued rise in prices beyond the current time 708. The determination at block 615 is therefore affirmative, and the server 116 proceeds directly to block 310. In other words, the server 116 can suppress update requests, relieving the system 100 of the additional network and computational load imposed by such requests, when historical data indicates that such requests are unlikely to lead to better offers. Following an affirmative determination at block 615, the server 116 can also generate an alert, warning message or the like for transmission to the relevant client subsystem 104, indicating that if payment is not provided before the expiry time, historical data indicates a likely increase in price. The definition of "non-advantageous" at block 615 can vary widely, depending on the configuration of the server 116, and need not be limited to price data (or specifically to increasing prices).

Returning to FIG. 3, when the determination at block 315 is negative, as noted earlier, the server 116 suppresses the sending of update requests, and returns to block 310. The determination at block 315 can be performed multiple times for distinct provider subsystems 108, and multiple instances of subsequent blocks of the method 300 can therefore also be performed. In other words, a negative determination at block 315 indicates that for a given provider subsystem 108, no update request will be sent. Update requests may still be sent to other provider subsystems 108, however.

Following an affirmative determination at block 315, at block 320 the server 116 generates and sends an update request to at least one provider subsystem 108. In particular, an update request is sent to each provider subsystem 108 for which an affirmative determination was made at block 315.

The generation and transmission of update requests at block 320 is based on the data object 400 itself, and on further optimization parameters in the repository 120. For example, the repository 120 can specify which types of requests to employ for each provider subsystem 108. The selection of request type can also be informed by the determination at block 515 (e.g. the server 116 can select a request type for which the determination at block 515 was negative).

The update requests, in general, can be explicit update requests directed to the provider subsystem 108 that originated the data object 400, or new offer requests directed to other provider subsystems 108. The new offer requests (e.g. NDC AirShopping requests) can be populated based on the content of the data object 400. Thus, in the present example, an AirShopping request may be transmitted to the provider subsystem 108-2 for flights from Barcelona to Montreal. Other attributes (e.g. dates, ancillary services and the like) can also be specified. An update request (e.g, an NDC OrderReshop request) may be sent to the provider subsystem 108-1

When the update requests have been sent, at block 325 the server 116 is configured to receive updated sets of content from each provider subsystem 108 to which a request was sent at block 320. At block 330, the server 116 is configured to automatically evaluate the updated content sets received at block 325. The processes by which the server 116 evaluates the updated content sets relative to the initial content (e.g. the data object 400) are beyond the scope of this discussion. In general, the repository 120 can contain scoring algorithms and the like for execution by the server 116 to determine whether a given update content set represents a "better" offer than the initial content of the data object 400, as well as than the other updated content sets.

When the evaluation at block 330 indicates that the updated content sets do not represent better offers, the updated content sets can be discarded and the server 116 can return to block 310. When at least one of the updated content sets represents a better offer, however, the server 116 can automatically initiate one or more actions to replace the initial content, or can prompt the relevant client subsystem 104 for further instruction. Specifically, the repository 120 can store (e.g. in association with the update scheduling configuration data mentioned above) an indication for each client subsystem 104 of whether content replacement is to be performed automatically.

When the server 116 is configured (e.g. for the client subsystem 104 associated with the data object 400) to perform content replacement automatically, at block 335 the server 116 selects the best offer from the updated content sets received at block 325, and generates at least one replacement request to book the updated content.

In other examples, as mentioned the server 116 is configured to prompt the client subsystem 104 associated with the data object 400 before proceeding to block 335. That is, the performance of block 330 includes both the identification of a better offer, and the determination of whether the relevant client subsystem 104 has instructed the server 116 to replace the data object 400 with that better offer. The server 116 can therefore complete the performance of block 330 by sending a message to the client subsystem 104 indicating the contents of the selected updated content, and awaiting a selection or dismissal of the updated content from the client subsystem 104. When a selection is received, the server 116 proceeds to block 335. Otherwise, the server 116 returns to block 310.

The nature of the replacement request(s) sent at block 335 varies according to the provider subsystem 108 associated with the initial content of the data object 400, and the provider subsystem 108 associated with the selected updated content. For example, the replacement requests can include a cancellation request to the provider subsystem 108 associated with the data object 400 and a booking request corresponding to the selected updated content. When the selected updated content and the initial content correspond to the same provider subsystem 108, a single replacement request in the form of an update request (e.g. OrderReshop) may be employed at block 335. In still other examples, the server 116 can send a single booking request at block 335, and take no specific action in relation to the initial content. Instead, the initial content can simply be allowed to expire.

Variations to the above systems and methods are contemplated. For example, although the expiry time mentioned above is discussed in connection with the expiry of a payment period for a booking, various other expiry times can also be used with the processes discussed herein. For example, some content may be associated with cancellation expiry periods, beyond which cancellation of the initial content incurs a fee.

Those skilled in the art will appreciate that in some embodiments, the functionality of the application 212 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method of optimizing transmission of requests for updated content from external data sources, comprising:
storing, at an intermediation server, a data object containing initial content received from at least one of the external data sources and associated with an expiry time;
storing, at the intermediation server, a set of optimization parameters;
obtaining an instruction at the intermediation server to request updated content corresponding to the data object;
in response to obtaining the instruction, selecting, based on the optimization parameters and the expiry time, between transmitting and suppressing a request for updated content from the external data sources, wherein the selecting includes:
(i) identifying current trend data corresponding to the initial content,
(ii) comparing the current trend data to historical trend data, and
(iii) when the current trend data and the historical trend data match, selecting between transmitting and suppressing the request for updated content based on the historical trend data;
when transmission of an update request is selected, transmitting at least one update request to at least one of the external data sources based on the initial content and the optimization parameters; and
in response to transmitting the at least one update request, receiving and storing respective sets of updated content from the external data sources.

2. The method of claim 1, further comprising:
in response to receiving and storing the sets of updated content, evaluating each set of updated content against the initial content; and
determining, based on the evaluations, whether to replace the initial content with a selected set of the updated content.

3. The method of claim 2, wherein determining whether to replace the initial content with the selected set of the updated content includes sending a prompt containing at least one of the sets of updated content to a client subsystem for selection.

4. The method of claim 2, wherein determining whether to replace the initial content with the selected set of the updated content includes automatically replacing the initial content with the selected set of the updated content.

5. The method of claim 1, wherein obtaining the instruction includes receiving the instruction at the intermediation server from a client subsystem.

6. The method of claim 1, further comprising:
storing, at the intermediation server, update scheduling configuration data; wherein obtaining the instruction includes generating the instruction at the intermediation server according to the scheduling configuration data.

7. The method of claim 1, wherein the optimization parameters include at least one of (i) an update request frequency threshold, and (ii) a time threshold; and
wherein determining whether to request updated content includes at least one of (i) determining whether the update request frequency threshold has been exceeded, and (ii) determining whether a difference between a current time and the expiry time is below the time threshold.

8. The method of claim 1, wherein the optimization parameters include the historical trend data corresponding to the initial content.

9. The method of claim 1, wherein the at least one update request includes at least one of:
a New Distribution Capability (NDC) AirShopping request;
an NDC OfferPrice request;
an NDC SeatAvailability request;
an NDC ServiceList request; and
an NDC OrderReshop request.

10. An intermediation server, comprising:
a memory storing (i) a data object containing initial content received from one or more external data sources and associated with an expiry time, and (ii) a set of optimization parameters;
a communications interface; and
a processor connected with the communications interface and the memory, the processor configured to:
obtain an instruction at the intermediation server to request updated content corresponding to the data object;
in response to obtaining the instruction, select, based on the optimization parameters and the expiry time, between transmitting and suppressing a request for updated content from the external data sources, wherein the selection includes:
(i) identifying current trend data corresponding to the initial content,
(ii) comparing the current trend data to historical trend data, and
(iii) when the current trend data and the historical trend data match, selecting between transmitting and suppressing the request for updated content based on the historical trend data;
when transmission of an update request is selected, transmit at least one update request to at least one of the external data sources based on the initial content and the optimization parameters; and
in response to transmitting the at least one update request, receive and store respective sets of updated content from the external data sources.

11. The intermediation server of claim 10, wherein the processor is further configured to:
in response to receipt and storage of the sets of updated content, evaluate each set of updated content against the initial content; and
determine, based on the evaluations, whether to replace the initial content with a selected set of the updated content.

12. The intermediation server of claim 11, wherein the processor is configured, in order to determine whether to replace the initial content with the selected set of the updated content, to send a prompt containing at least one of the sets of updated content to a client subsystem for selection.

13. The intermediation server of claim 11, wherein the processor is configured, in order to determine whether to replace the initial content with the selected set of the updated content, to automatically replace the initial content with the selected set of the updated content.

14. The intermediation server of claim 10, wherein the processor is configured, in order to obtain the instruction, to receive the instruction at the intermediation server from a client subsystem.

15. The intermediation server of claim 10, wherein the processor is configured, in order to obtain the instruction, to generate the instruction according to scheduling configuration data stored in the memory.

16. The intermediation server of claim 10, wherein the optimization parameters include at least one of (i) an update request frequency threshold, and (ii) a time threshold; and
wherein the processor is configured, in order to determine whether to request updated content, to at least one of (i) determine whether the update request frequency threshold has been exceeded, and (ii) determine whether a difference between a current time and the expiry time is below the time threshold.

17. The intermediation server of claim 10, wherein the optimization parameters include the historical trend data corresponding to the initial content.

18. The intermediation server of claim 10, wherein the at least one update request includes at least one of:
a New Distribution Capability (NDC) AirShopping request;
an NDC OfferPrice request;
an NDC SeatAvailability request;
an NDC ServiceList request; and
an NDC OrderReshop request.

19. A non-transitory computer-readable medium storing computer-readable instructions executable by a processor of an intermediation server to:
store (i) a data object containing initial content received from one or more external data sources and associated with an expiry time, and (ii) a set of optimization parameters;
obtain an instruction at the intermediation server to request updated content corresponding to the data object;
in response to obtaining the instruction, select, based on the optimization parameters and the expiry time, between transmitting and suppressing a request for updated content from the external data sources, wherein the selection includes:
(i) identifying current trend data corresponding to the initial content,
(ii) comparing the current trend data to historical trend data, and
(iii) when the current trend data and the historical trend data match, selecting between transmitting and suppressing the request for updated content based on the historical trend data;
when transmission of an update request is selected, transmit at least one update request to at least one of the external data sources based on the initial content and the optimization parameters; and
in response to transmitting the at least one update request, receive and store respective sets of updated content from the external data sources.

* * * * *